United States Patent
Berg et al.

(10) Patent No.: US 6,502,748 B2
(45) Date of Patent: *Jan. 7, 2003

(54) SYSTEM FOR CARD TO CARD TRANSFER OF SECURE DATA

(76) Inventors: Jon N. Berg, 1409 Dolphin Ter., Corona del Mar, CA (US) 92625; Eric L. Nelson, 14 Trafalgar, Newport Beach, CA (US) 92660

( * ) Notice: Subject to any disclaimer, the term of this patent is extended or adjusted under 35 U.S.C. 154(b) by 0 days.

This patent is subject to a terminal disclaimer.

(21) Appl. No.: 10/145,076

(22) Filed: May 13, 2002

(65) Prior Publication Data
US 2002/0130187 A1 Sep. 19, 2002

Related U.S. Application Data (63) Continuation of application No. 09/418,059, filed on Oct. 14, 1999, now Pat. No. 6,394,343.

(51) Int. Cl.[7] .............................................. G06F 17/60
(52) U.S. Cl. ........................ 235/379; 235/380; 235/492
(58) Field of Search ............................... 235/379, 441, 235/487, 492, 380; 902/25, 26; 705/39, 41, 44; 361/737; 382/124

(56) References Cited

U.S. PATENT DOCUMENTS

| | | | |
|---|---|---|---|
| 4,277,837 A | | 7/1981 | Stuckert |
| 4,625,276 A | * | 11/1986 | Benton et al. ................. 705/44 |
| 4,766,293 A | | 8/1988 | Boston |
| 5,623,552 A | * | 4/1997 | Lane ........................... 382/124 |
| 5,770,849 A | | 6/1998 | Novis et al. |
| 5,777,903 A | | 7/1998 | Piosenka et al. |
| 5,789,733 A | | 8/1998 | Jachimowicz et al. |
| 5,861,841 A | | 1/1999 | Gildea et al. |
| 5,884,292 A | | 3/1999 | Baker et al. |
| 5,929,427 A | * | 7/1999 | Harada et al. ............... 235/492 |
| 6,010,066 A | * | 1/2000 | Itou et al. ..................... 235/379 |
| 6,070,795 A | | 6/2000 | Feiken |
| 6,394,343 B1 | * | 5/2002 | Berg et al. .................... 235/379 |

FOREIGN PATENT DOCUMENTS

| | | | |
|---|---|---|---|
| DE | 43 08 597 | | 8/1993 |
| JP | 3-220698 A | * | 9/1991 |
| JP | 9-305832 | | 11/1997 |
| WO | WO 93/07596 | | 4/1993 |

OTHER PUBLICATIONS

P.L. Hawkes, et al., *Integrated Circuit Cards, Tags and Tokens*, BSP Professional Books, ISBN 0–632–01935–2, 1990, pp. i, iii–vii, ix–xi, xiii–xvl, 1–38, 63–80, and 165–176.

Copy of Feb. 20, 2001 PCT International Search Report from corresponding International Patent Application No. PCT/US00/40970, received on Mar. 8, 2001.

* cited by examiner

*Primary Examiner*—Michael G. Lee
*Assistant Examiner*—Jared J. Fureman
(74) *Attorney, Agent, or Firm*—Knobbe, Martens, Olson & Bear, LLP (57) ABSTRACT

A smart card stores secure data, such as monetary values, and selectively transfers the secure data to or receives the secure data from a compatible smart card. The smart card includes a data storage device that stores the secure data. An identification input system receives identification input from a user. Control circuitry is responsive to the identification input to transfer secure data into the data storage device from a compatible smart card or to transfer secure data out of the data storage device to a compatible smart card when the control system determines from the identification input that the transfer is authorized. A data transfer interface in an edge of one card couples directly to a like interface in a slot of the other card to enable the secure data to be transferred between the two cards when the two cards are moved relative to each other.

12 Claims, 5 Drawing Sheets

SYSTEM FOR CARD TO CARD TRANSFER OF SECURE DATA

RELATED APPLICATIONS

This application is a-continuation of U.S. patent application Ser. No. 09/418,059, filed on Oct. 14, 1999, now U.S. Pat. No. 6,394,343 B1 for System for Card to Card Transfer of Monetary Values which is incorporated by reference herein.

BACKGROUND OF THE INVENTION

1. Field of the Invention

The present invention is in the field of electronic transfer of monetary values using smart card technology wherein a credit card sized card includes internal electronics or other circuitry enabling the card to receive and store data representing monetary values and to selectively transfer data to another device to effect the transfer of all or a portion of the stored monetary values.

2. Description of the Related Art

Credit cards are commonly used in monetary transactions wherein the owner of a credit card presents the card to a vendor (either a person or a machine), and the vendor provides the credit card owner with something of value (e.g., a product, airline tickets, a room in a hotel, a meal, etc.). The typical credit card is a passive device that includes human readable characters embossed or printed on one side to identify the credit card owner and the owner's account number. Generally, credit cards also have a magnetic stripe on an opposite side. The magnetic stripe can be automatically "read" by a credit card reader so that the credit card information (i.e., the owner's name and account number) can be transferred from the card to a data processing system (e.g., to the credit company via a telecommunications system). After verifying that the credit card information is valid, that the credit card owner has an acceptable account balance, and that the credit card has not been reported stolen, the data processing system typically sends an authorization message to the vendor informing the vendor that the transaction can proceed. Eventually, the credit card owner receives a bill from the credit card company that includes the amounts of completed transactions that the credit card owner must pay to the credit card company. During the entire process, the credit card itself is not modified, nor is the information on the magnetic stripe modified.

Unlike credit cards, "smart cards" include electronic circuitry or other circuitry that enable the smart card to actively participate in a financial transaction. A smart card can include an electrical connection, an optical coupler, a magnetic coupler, an RF coupler, or other data transfer interface, to enable the smart card to transfer data to and receive data from another transaction device, such as a vendor's point of sale (POS) terminal, an automatic teller machine (ATM), a computer interface, a telephone interface, an internet connection, or the like. Typically, a smart card includes internal memory for storage of data and includes an interface for transferring data to and from the memory. In addition, the smart card may include internal processing capability to enable the smart card to engage in more complicated data transfer transactions, such as, for example, transactions which require the smart card owner to enter a personal identification number (PIN) or transactions which require the smart card and the other transaction device to perform a security algorithm (e.g., an exchange of passwords) before proceeding with a transaction. The smart card may advantageously include a keyboard to enable the smart card owner to enter identification information and to enter transaction amounts. For a more detailed discussion and overview of smart card technology, see, for example, P. L. Hawkes, et al. (Eds.), *Integrated Circuits Cards, Tags and Tokens, New Technology and Applications*, BSP Professional Books, (ISBN 0-632-01935-2), 1990.

One typical use for a smart card is as a replacement for cash. Rather than entering into a number of credit card transactions and then receiving a consolidated bill from the credit card company on a monthly basis, the owner of a smart card purchases funds (i.e., monetary values) that are stored in the memory of the smart card. Then, when the smart card owner engages in a financial transaction (e.g., a product purchase, or the like), a portion of the monetary values is electronically transferred to another device (e.g., a point of sale terminal), and the transferred monetary values are deducted from the smart card memory. Thus, the smart card is used in a similar manner to the use of cash. Depleting the monetary value in the smart card memory has the same effect as depleting the cash in a wallet or purse. When the monetary value is low or is entirely depleted, the smart card owner must return to a bank or to an appropriate terminal (e.g., an ATM terminal) to have the smart card recharged with the data equivalent of cash just as the user of cash must return to the bank or ATM to obtain more cash. See, for example, U.S. Pat. No. 5,884,292, which is incorporated by reference herein.

Although smart cards have the advantage of providing a convenient way of engaging in cash-free financial transactions, the smart cards have the disadvantage of not being as flexible as cash. In particular, a business person, a shopper or a traveler operating on a cash basis has the benefit of obtaining cash in many denominations. When a large amount of cash is desired, a portion of the cash is obtained in large denominations and a portion of the cash is obtained in smaller denominations. Furthermore, unless the cash holder is expecting a particularly large cash transaction on a particular day, the cash holder will likely keep only a portion of the available cash on his or her person so that all the cash will not be subject to being lost or stolen at the same time. The remaining portion can be kept in a home, office or hotel safe until needed. The owner of a typical smart card does not have this advantage. If a smart card having a stored data value representing a large monetary amount is lost or stolen, the entire amount is gone, as if the smart card owner had lost a wallet with all the cash in the wallet. The smart card owner could decide to carry a number of smart cards with varying cash values stored therein, but such a decision basically returns the smart card owner to the previous situation of having a large number of monetary devices rather than being able to carry only a single device. Another option is to carry a smart card having a smaller monetary value, but this option requires the smart card owner to return to the bank or ATM more frequently and does not provide the smart card owner with the flexibility of varying the monetary value in the smart card in response to varying needs (e.g., a last minute purchase of a ticket, car repairs while on vacation, etc.).

In view of the foregoing, there is a need for a smart card system that would enable the smart card owner to have the benefit and flexibility of cash while retaining the small size, convenience and security of the smart card technology.

SUMMARY OF THE INVENTION

The present invention is directed to a system which provides the convenience and flexibility of cash and which also provides the security and ease of carrying a smart card.

In particular, the present invention permits the owner of a smart card to vary the monetary value stored in a particular smart card without requiring the owner to return to a bank, an ATM, or the like. The smart card system in accordance with the present invention provides the ease and immediacy of use of cash and allows transactions to occur between two smart cards. The system described herein uses smart cards capable of both credit and debit functions.

The present system is based upon a smart card capable of immediately effecting monetary transactions between individuals or between two cards owned by the same individual by crediting monetary value to the memory of a first smart card while debiting monetary value from the memory of a second smart card. The monetary transaction preferably occurs by directly interfacing the first smart card with the second smart card. By providing this capability of transferring the monetary value directly from one smart card to another smart card, a system of such cards provides the equivalent of cash and can replace the use of cash for many transactions. In particular, by engaging the first smart card with the second smart card, a predetermined amount of money is transferred between the two smart cards, such that the monetary value of one of the smart cards is increased and the monetary value of the other smart card is decreased by the appropriate amount. In this manner, an individual can also transfer a sufficient amount of money from a first smart card having a large stored monetary value to a second smart card having a small stored monetary value, store the first smart card in a safe location and carry the second smart card for use in monetary transactions. In like manner, two individuals can transfer monetary values from one individual's smart card to the other individual's smart card. For example, a passenger in a taxi can transfer monetary value to the smart card of the taxi operator rather than requiring the taxi operator to have a commercial transaction device in the taxi. As another example, a parent can transfer a limited monetary value from the parent's smart card to a child's smart card so that the child will have sufficient funds for school, for a trip to the mall or for an evening at the movies, but not have a large monetary value in the smart card that can be lost, stolen or misspent. It should be noted that because a smart card generally has value only to the person knowing the personal identification number, there is less incentive for a thief to steal a smart card.

In addition to the smart card to smart card transactions unique to the present invention, the smart cards are also able to engage in conventional monetary transactions with commercial establishments, vending machines, slot and other gaming machines, ATMs, highway toll booths, and the like, as well as other entities via electronic commerce (e.g., internet commerce). Such transactions may also be made involving different currencies, such as the dollar and the pound or Euro. Dollars transferred to a smart card operating on a pound (or Euro) system may be stored as dollars, or, in the alternative, the dollars may be converted to pounds before storing if an exchange rate is factored into the transaction.

A particular aspect of the present invention is that "high value" cards (e.g., the parent's card in the foregoing example) can be linked with "low value" satellite cards (e.g., the child's card), such that the monetary value represented by such a satellite card can be repeatedly replenished as needed by interfacing with the "high value" card, each such interface effecting the transference of monetary value from the "high value" card to the "low value" satellite card. As a further example, a person traveling might want to have access to a larger sum of money throughout the person's travels (e.g., many thousands of dollars). However, the person would not want to carry the large sum on a daily basis such that the entire sum could be lost or stolen at one time. The traveler would initially transfer a significant monetary value to a "large value" card. From such a "large value" card, a few hundred dollars could be transferred to the "low value" satellite card to spend in connection with enjoying a business dinner, a shopping expedition, or the like. Because the satellite card can operate in both the debit mode and the credit mode, the traveler can transfer monetary value into the satellite card from other sources. For example, if the traveler is in a city having gambling and the traveler wins, the traveler's winnings can be transferred to the satellite card. When the traveler returns to his or her hotel room, the increased monetary value of the "low value" satellite card can be transferred to the "high value" card, thereby reducing the monetary value of the satellite "low value" card for further use. The use of "high value" and "low value" cards results in added security because the traveler would not lose immediate access to the larger monetary value if the "low value" card is lost or stolen. Also, such a system provides the opportunity for the traveler to budget or limit the use of his or her funds by not having the traveler's entire funds immediately available.

The smart cards in accordance with the present invention include security features similar to the security features found on other smart cards being used in place of cash. Such security features include the use of personal identification (or PIN) numbers, fingerprint identification, holograms, silicon sensor technology, social security numbers, passport numbers, voiceprint, and all such security methods in accordance with the available art.

Current technology is available to effectively manufacture the cards described herein. Credit card sized smart cards are available that have the appearance of calculators, that are solar powered, and that have key pads and luminous numbers for readouts. Such smart cards utilize low cost, high density digital storage capacity of integrated circuit memory chips and include processing logic that handle data transfer transactions as well as the necessary security interface. Similarly, magnetic discs and cards and optical discs and cards may also be advantageously used. In accordance with one aspect of the present invention, one part of the card processing logic manages credit transactions and another part of the logic manages debit transactions, with either part capable of communicating with the opposite counterparts of a second card in order to complete a transaction. Alternatively, a common processing logic manages both types of transactions.

As discussed above, any type of data transfer technology may be used to communicate between two smart cards. In particular, the technology presently used to transfer from a smart card to another type of device (e.g., a point of sale terminal, an ATM, or the like) may be used. For example, direct electrical interconnections, magnetic coupling and optical coupling can be used to provide communication between two cards.

One aspect of the present invention is a smart card that stores monetary values and selectively transfers monetary values to and receives monetary values from a compatible smart card. The smart card includes a data storage device that stores data representing monetary values. Control circuitry controls the transfer of the monetary values into the data storage device and controls the transfer of the monetary values out of the data storage device. A data transfer interface couples directly to an interface on the compatible smart card to enable data to be transferred between the smart card and the compatible smart card.

Another aspect of the present invention is a system for electronic transfer of monetary values that includes first and second smart cards. Each of the first and second smart cards includes a data storage device that stores data representing monetary values. Control circuitry in each smart card controls the transfer of the monetary values into the data storage device and controls the transfer of the monetary values out of the data storage device. A first data transfer interface on the first smart card couples directly to a second data transfer interface on the second smart card to enable data to be transferred between the first and second smart cards.

BRIEF DESCRIPTION OF THE DRAWING FIGURES

The present invention will be described in more detail below in connection with the accompanying drawing figures in which.

DETAILED DESCRIPTION OF THE PREFERRED EMBODIMENTS OF THE PRESENT INVENTION

Figure 1:
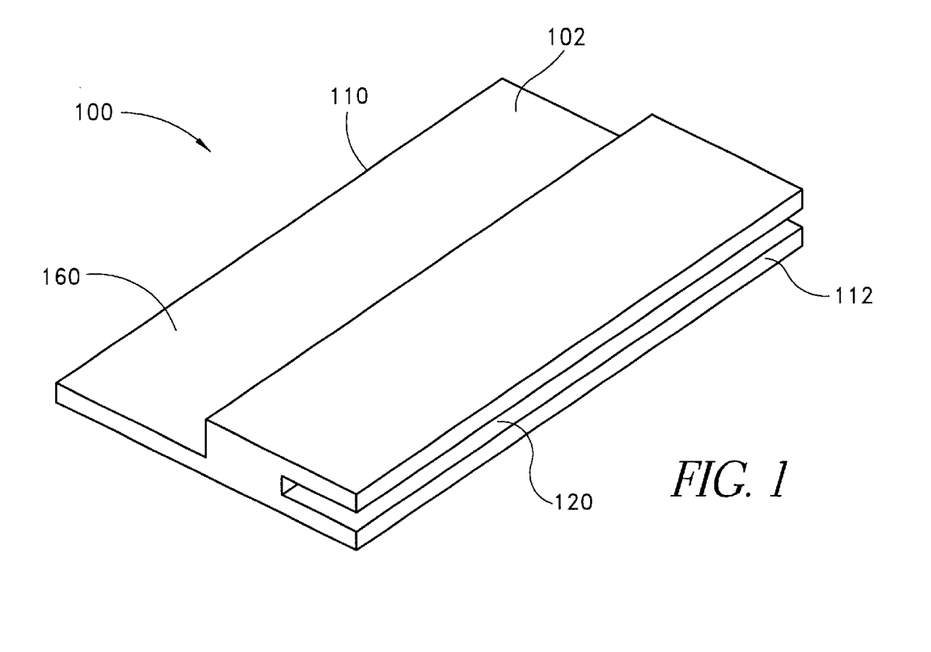
FIG. 1 is a perspective view of a first side of an embodiment of a smart card in accordance with the present invention.

FIG. 1 illustrates a first side 102 of an exemplary smart card 100 in accordance with the present invention. As illustrated, the smart card 100 has a size and shape that generally corresponds to the size and shape of a conventional credit card. For example, the smart card 100 is generally rectangular and has dimensions of approximately 3.4 inches by 2.1 inches (86 mm by 54 mm). The thickness of the smart card 100 can vary. In the embodiment shown in FIG. 1, the smart card 100 has a first thickness along a first edge 110 and a second thickness along a second edge 112. The thickness of the first edge 110 is approximately the thickness of a conventional credit card and may be less than approximately 0.05 inch. The thickness of the second edge 112 is approximately three times the thickness of the first edge and may be less than approximately 0.15 inch. As illustrated, the second edge 112 has a slot 120 formed therein. The purpose of the slot 120 will be described below.

Figure 2:
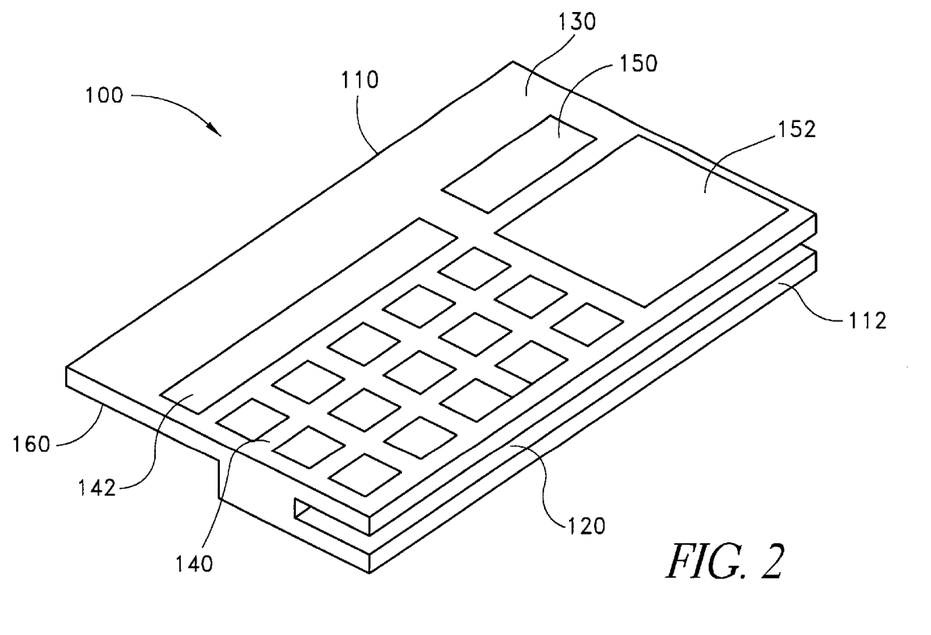
FIG. 2 is a perspective view of a second side of the smart card of FIG. 1.

As illustrated in FIG. 2, a second side 130 of the smart card 100 advantageously includes a keypad portion 140 and a display portion 142. Optionally, the second side 130 may also include a photovoltaic cell 150 and a fingerprint sensor 152. See, for example, U.S. Pat. No. 5,777,903, which is incorporated by reference herein.

The keypad portion 140 advantageously comprises a matrix of membrane keyswitches which operate in a conventional manner to detect pressure applied by a user and to communicate the presence and absence of such pressure as the opening and closing of a switch. For example, the keyswitches are advantageously similar to the keyswitches used in inexpensive credit card sized calculators. The keyswitches advantageously include conventional numeric and function keys found on a conventional credit card sized calculator, and also includes function keys to initiate transactions. The outputs from keyswitches in the keypad portion 140 are provided to internal circuitry described below. The user of the smart card 100 uses the keypad portion 140 to enter information to initiate a transaction (e.g., a debit or credit transaction or an inquiry transaction) as discussed below.

The display portion 142 advantageously comprises a plurality of low power display devices similar to the display devices used in inexpensive credit card sized calculators. The display devices display the results of transactions activated by the user using the keypad portion 140. The operation of display devices such as the display portion 142 is well known to the art and will not be described in detail herein.

The optional photovoltaic cell 150 is used to provide power to the smart card 100 when the smart card 100 is removed from a wallet or other storage location and the smart card is positioned to receive light. The power provided by the photovoltaic cell 150 is preferably in addition to the power provided by an internal battery (not shown) so that the internal battery lasts substantially longer than if the internal battery was the only power source. The output from the photovoltaic cell 150 may also be used to activate the smart card 100 so that the smart card 100 is only active in the presence of light, thus further saving battery power. The operation of photovoltaic cells, as described above, is well know in connection with credit card calculators and other low power devices, and such operation will not be described in detail herein.

The optional fingerprint sensor 152 is advantageously included with particular embodiments of the smart card 100 to provide an extra level of security in addition to a personal identification number. Small fingerprint sensors are now commercially available to fit in a device as small as the smart card 100. The smart card 100 is initially programmed to detect and store a fingerprint from the owner of the smart card 100. The stored fingerprint is then compared with the current fingerprint detected by the sensor 152 to determine whether the person attempting to perform a transaction is an authorized user. In further optional embodiments, fingerprints from multiple authorized users can be stored and indexed in accordance with the users' personal identification numbers so that a smart card can be shared (e.g., among family members).

As illustrated in FIGS. 1 and 2 and as discussed above, the smart card 100 has the first edge 110 and the second edge 112 of differing thicknesses. Furthermore, the second edge 112 has the slot 120 formed therein. For purposes of the following discussion, the surface proximate to the first edge 110 will be referred to as the "debit" surface 160. The slot 120 formed in the smart card 100 proximate to the second edge 112 will be referred to as the credit slot 120.

The debit surface 160 operates in a conventional manner to enable the smart card 100 to interact with conventional smart card terminal devices (e.g., point of sale terminals, automatic teller machines, etc.) When the debit surface 160 of the smart card 100 is inserted into a terminal device (not shown) having a compatible interface, the smart card 100 and the terminal device communicate via the interface so that a portion of the monetary value stored as data in the smart card 100 is debited from the smart card memory and is transferred to the terminal device via the interface. The terminal device may also increase the monetary value in the smart card memory via the interface on the debit surface 160. As discussed above, the interface on the debit surface 160 may be a magnetic interface, an optical interface, an RF interface, or any other interface in use with conventional smart cards.

Figure 3:
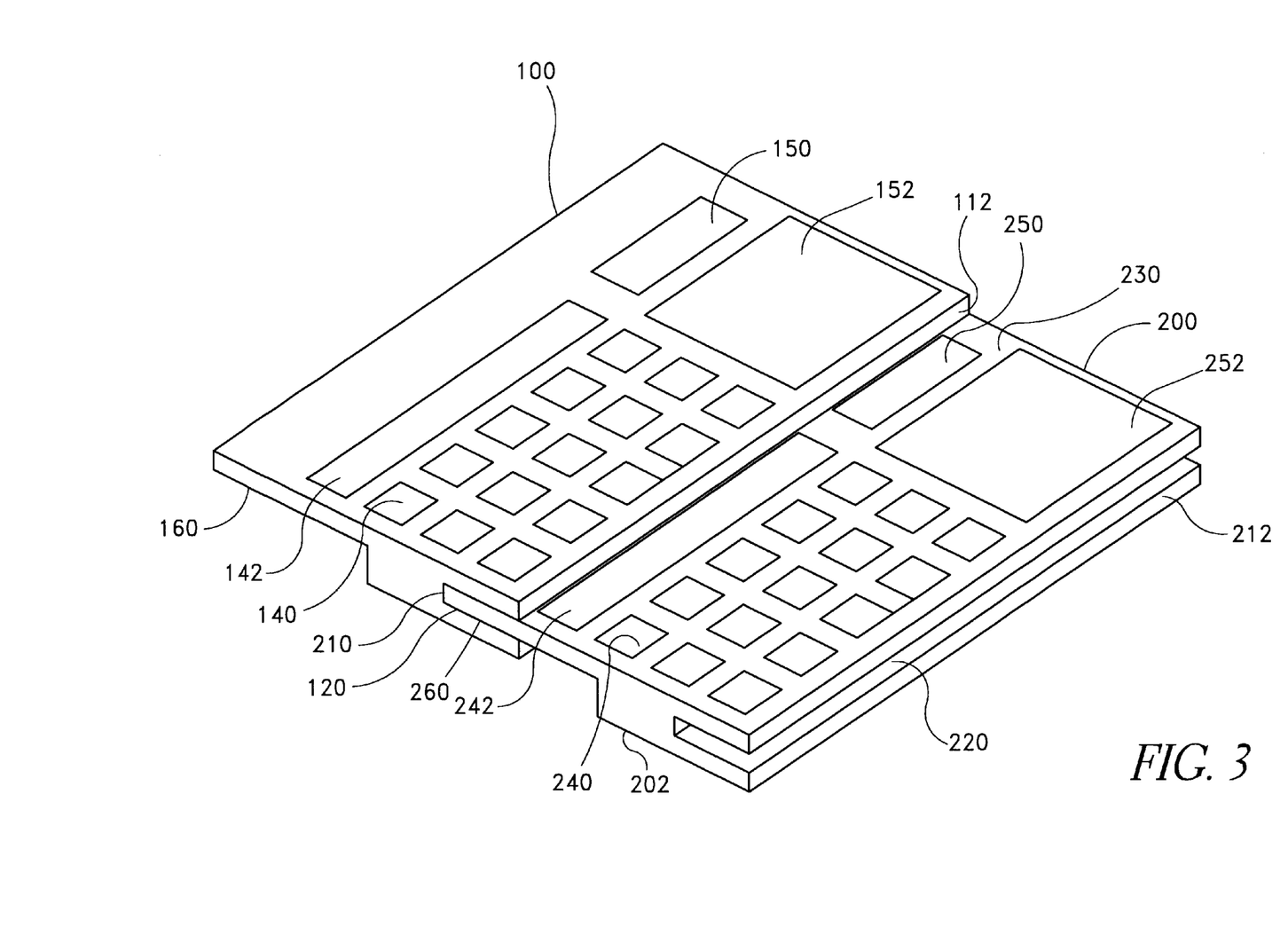
FIG. 3 is a perspective view illustrating the interaction between two smart cards in accordance with the present invention.

As shown in FIG. 3, a second smart card 200 is similar to the first smart card 100. The second smart card 100 has a first side 202, a first edge 210, a second edge 212, a credit slot 220, a second side 230, a keypad portion 240, a display portion 242, an optional photovoltaic cell 250 an optional fingerprint sensor 252 and a debit surface 260. The credit slot 120 of the first smart card 100 is sized to receive the debit surface 260 of the second smart card 200. In like manner, the credit slot 220 of the second smart card 200 is sized to receive the debit surface 160 of the first smart card 100. In particular, the credit slots 120, 220 are sized to provide respective openings just slightly larger than the thicknesses of the first edges 110, 210. Thus, for example, the first edge 210 and the debit surface 260 of the second smart card 200 are easily inserted into the credit slot 120 of the first smart card 100 and is well-guided therein.

The keypad portions 140, 240 of the respective smart cards 100, 200 are used to set up a transaction between the two smart cards. In one embodiment of the present invention, the keypad portions 140, 240 are activated by the user of each card prior to engaging the debit surface of one card with the credit slot of the other card. Thus, each user may set up the transaction by entering the user's PIN (and optionally applying the appropriate finger to the finger print sensor 152, 252) without having the other user observe the numbers entered or the finger used to initiate the transaction. The display portions 142, 242 show the respective user what has been entered into each smart card 100, 200, and may also be used to show the other user that the transaction has been properly set up (i.e., that the correct amount is about to be transferred).

Figure 4:
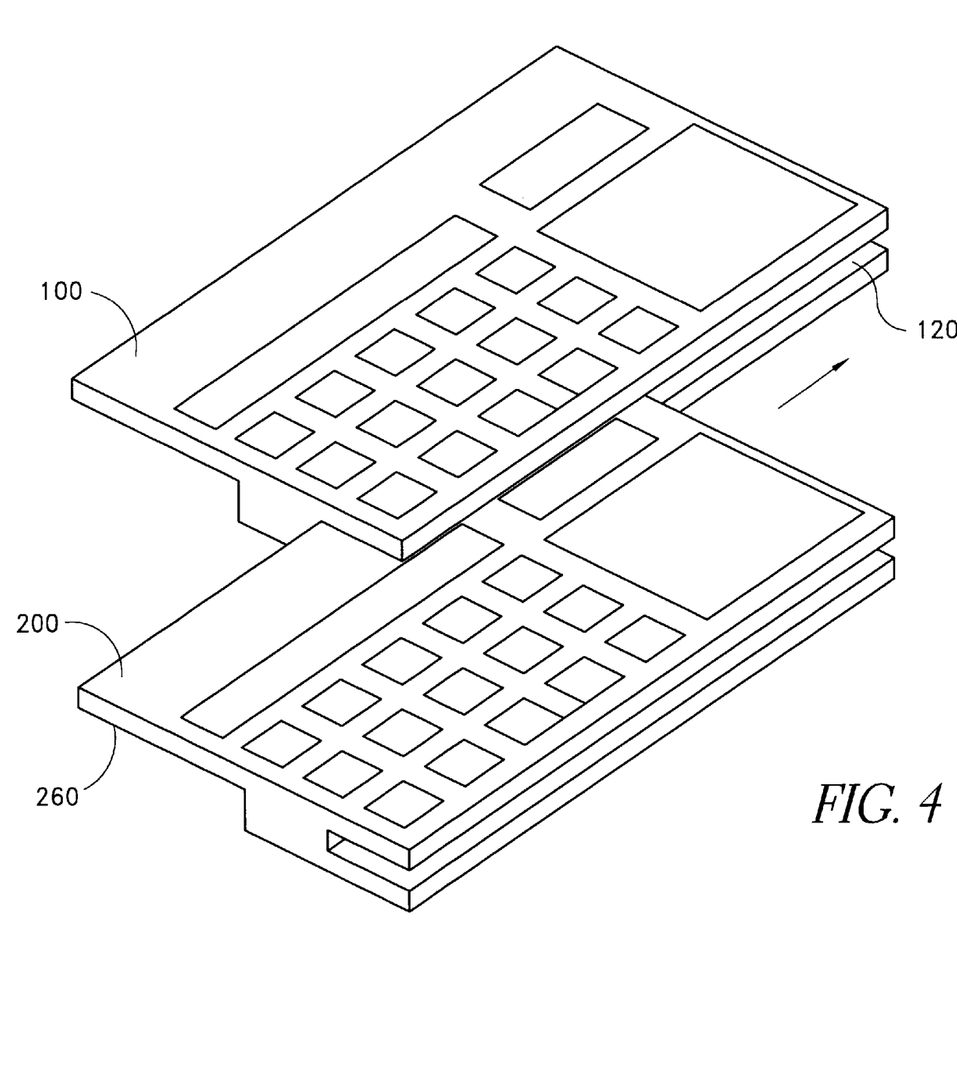
FIG. 4 is a perspective view illustrating an alternative interaction between two smart cards wherein a transfer of monetary values occurs by moving one card with respect to the other card.

After setting up the transaction, the debit surface 260 of the smart card from which the monetary value is to be transferred (e.g., the second smart card 200 in the illustration in FIG. 3) is inserted into the credit slot 120 of the smart card to receive the transferred monetary value (e.g., the first smart card 100 in FIG. 3). The transaction is then initiated to transfer the monetary value from the second smart card 200 to the first smart card 100. The transaction may be initiated by activating a particular function key or sequence of function keys on the keypad portion 240 of the second smart card 200. Alternatively, as shown in FIG. 4, the transaction may be initiated by moving the two smart cards with respect to each other while maintaining the debit surface 260 of the second smart card 200 within the credit slot 120 of the first smart card. For example, in FIG. 4, the two smart cards 100, 200 are magnetically coupled, and the relative movement of the two cards triggers the two cards to interchange data.

Figure 5:
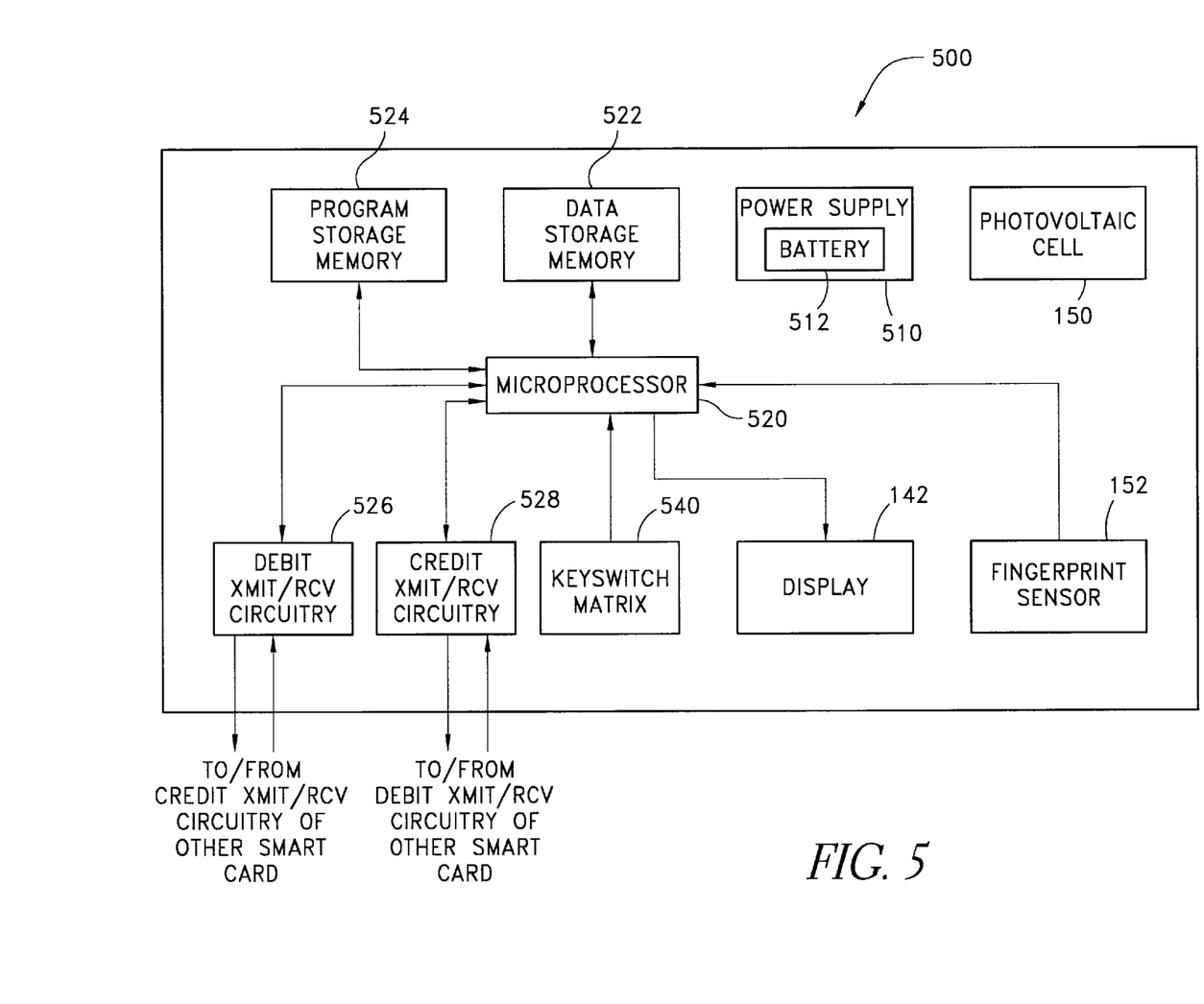
FIG. 5 is a block diagram of the internal architecture of an exemplary smart card in accordance with the present invention.

FIG. 5 illustrates a block diagram of an exemplary electronics system 500 that implement a smart card in accordance with the present invention. In particular, the system 500 includes a power supply 510, which advantageously includes a battery 512 and which may include the photovoltaic cell 150 discussed above. The power supply 510 provides power for a processor 520, a data storage memory 522, a program storage memory 524, debit transmit/receive (XMT/RCV) circuitry 526 and a credit transmit/receive (XMT/RCV) circuitry 528. (The connections from the power supply 510 to the other components are not shown.) The debit transmit/receive circuitry 526 and the credit transmit/receive circuitry 528 are advantageously positioned so that when the two smart cards (e.g., the cards 100, 200 in FIG. 3) are positioned to interface with each other, as discussed above, the debit transmit/receive circuitry 526 of the smart card providing the monetary value to be transferred is positioned proximate the credit transmit/receive circuitry 528 of the smart card receiving the transferred monetary value.

The system 500 also includes a keyswitch matrix 540, which represents the keypad portion 140 discussed above, and includes the display 142. The system 500 optionally includes the fingerprint sensor 152 discussed above.

The processor 520 is advantageously a low power microprocessor. When activated, the microprocessor 520 executes instructions stored within the program storage memory 524 and scans the keyswitch matrix 540 to determine the functions to perform. When the microprocessor 520 detects the activation of keyswitches by the user and recognizes the key sequence as a proper key sequence, the microprocessor 520 performs the selected function. For example, the microprocessor 520 may interpret the command entered by the keyswitches as a personal identification number (PIN), in which case, the microprocessor 520 determines whether the PIN is correct. Assuming the PIN is correct, the microprocessor 520 may then require the user to place a finger on the fingerprint sensor 152, if present.

Either in response to the correct PIN or the combination of the correct PIN and correct fingerprint, the microprocessor 520 then proceeds to perform the requested function. Assuming the requested function is a data transfer function, the microprocessor 520 then activates the debit transmit/receive circuitry 526 if the requested function is a debit function or activates the credit transmit/receive circuitry 528 if the requested function is a credit function. Thereafter, the microprocessor 520 transfers data to or from the data storage memory 522 from or to the activated transmit/receive circuitry.

In the preferred embodiment, the data storage memory 522 is flash memory. Data are stored in the flash memory when the power supply 510 provides power to the microprocessor 520 and to the data storage memory 522. By using flash memory, the data written into the data storage memory 522 is nonvolatile and remains in the data storage memory 522 when the power is turned off.

The data storage memory 522 advantageously includes sufficient storage locations to store information regarding particular transactions as well as storing the amount of transactions. For example, the stored information advantageously includes the identification of the source of monetary values transferred into the smart card and identification of the destination of monetary values transferred out of the smart card. This enables the owner of the card to maintain a record of "cash" transactions using the smart card. In addition, the stored information can also include the monetary unit of a transaction, such that, for example, a smart card operating in dollars may receive a monetary value from another smart card in pounds and store the received monetary value in pounds until the monetary value can be converted to dollars at an official currency exchange. Alternatively, the smart card can advantageously include currency exchange rate information to automatically convert received monetary values in other currencies to the operating currency of the smart card.

The data storage memory 522 is also used to store data representing the personal identification number of the user (or the personal identification numbers of multiple users) and to optionally store fingerprint information for one or more users. It should be understood that the data stored in the data storage memory 522 is preferably encrypted so that personal identification numbers and fingerprint information cannot be readily determined by disassembly of the smart card 100. The instructions stored in the program storage memory 524 are also advantageously encrypted to inhibit reverse engineering of the program code executed by the microprocessor 520. A number of techniques are conventionally available for protecting smart card transactions by encryption or other security methods. See, for example, U.S. Pat. Nos. 5,461,217 and 5,602,915, which are incorporated by reference herein.

Figure 6:
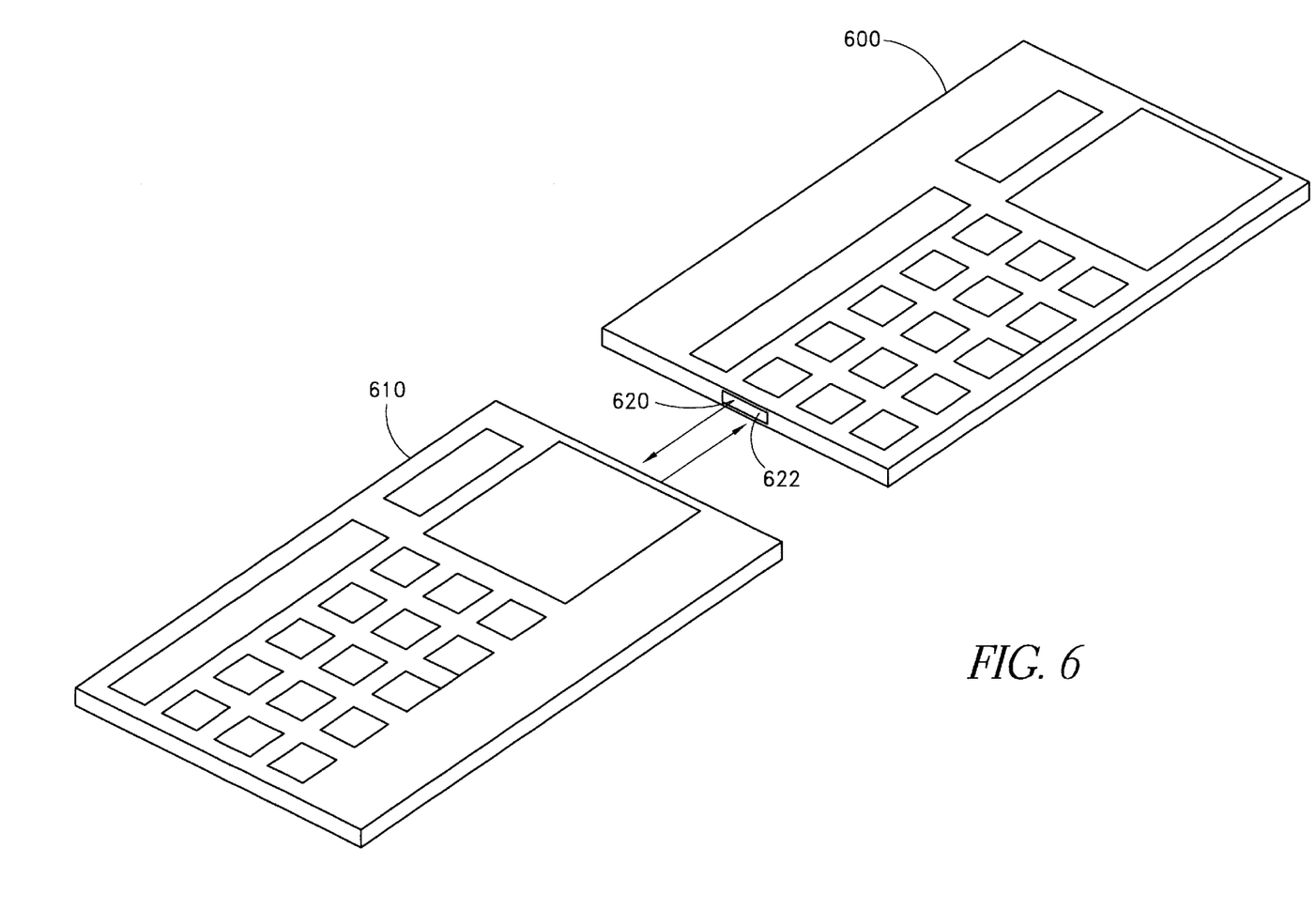
FIG. 6 is a perspective view illustrating the interaction of two smart cards in accordance with an alternative embodiment of the present invention.

FIG. 6 illustrates an alternative embodiment which may be used to eliminate the credit slot 120. In particular, in FIG. 6, a first smart card 600 and a second smart card 610 communicate via optical coupling. Each of the smart cards 600, 610 has at least one respective optical signal transmitter 620 (e.g., a light emitting diode (LED)) and has at least one respective optical signal receiver 622 (e.g., a phototransistor). The first smart card 600 and the second smart card 610 are positioned so that the optical signals transmitted by one smart card are received by the other smart card, and vice versa so that the two smart cards may interchange data without physically touching one another. In the embodiment of FIG. 6, the debit transmit/receive circuitry 526 and the credit transmit/receive circuitry 528 of FIG. 5 may be advantageously combined into a unified set of circuitry. An exemplary smart card system having optical coupling is illustrated in U.S. Pat. No. 5,789,733, which is incorporated by reference herein.

As presented above, the present invention provides a convenient and safe alternative to cash. A smart card may be credited with a monetary value and may transfer all or a portion of that value to a second smart card. With the use of smart cards according to the present invention, the need for carrying cash is eliminated. Because the smart cards are protected using security features such as personal identification numbers (PIN) and fingerprint identification, the smart cards are of no value to anyone other than the authorized user. The combination of the secure smart cards and the elimination of cash should discourage theft. For example, when a taxi driver is paid using a smart card according to the present invention, the taxi driver does not have to carry cash in the cab. The smart card would be of no value to a thief because of the security features. Therefore, a thief is not going to attempt to rob a taxi driver who has no cash and only has a secure smart card.

Although described above with reference to the preferred embodiments, modifications within the scope of the invention may be apparent to those skilled in the art, all such modifications are intended to be within the scope of the appended claims.

What is claimed is:

1. A smart card that stores secure data and that selectively transfers secure data to and receives secure data from a compatible smart card, the smart card comprising:
   a data storage device that stores secure data;
   an identification input system on the smart card that receives identification input from a user;
   control circuitry that controls the transfer of secure data into and out of the data storage device, the control circuitry coupled to the identification input system and responsive to the identification input received by the identification input system to selectively transfer secure data when the control circuitry determines from the identification input that the transfer is authorized; and
   a data transfer interface that couples directly to an interface on the compatible smart card to enable secure data to be transferred between the smart card and the compatible smart card when authorized by the control circuitry, the data transfer interface comprising a coupling in a slot along an edge of the smart card, wherein the data are transferred by sliding the interface of the compatible card through the slot of the smart card.

2. The smart card of claim 1, wherein the data transfer interface comprises a magnetic coupling.

3. The smart card of claim 1, wherein the identification input system on the smart card includes a keypad and display coupled to the control circuitry.

4. The smart card of claim 1, wherein the identification input system on the smart card comprises a fingerprint sensor coupled to the control circuitry.

5. The smart card of claim 1, wherein the control circuitry includes a microprocessor.

6. The smart card of claim 1, wherein the secure data represents monetary values.

7. A portable system for electronic transfer of secure data comprising:
   first and second smart cards, each of the first and second smart cards comprising:
      a data storage device that stores secure data;
      an identification input system on the smart card that receives identification input from a user;
      control circuitry that controls the transfer of secure data into and out of the data storage device, the control circuitry coupled to the identification input system and responsive to the identification input received by the identification input system to selectively transfer secure data when the control circuitry determines from the identification input that the transfer is authorized; and
   a first data transfer interface on the first smart card that couples directly with a second data transfer interface on the second smart card to enable secure data to be transferred between the first and second cards when authorized by the control circuitry, wherein the first data transfer interface comprises a slot along an edge of the first smart card and wherein the secure data are transferred by sliding the second data transfer interface of the second smart card through the slot of the first smart card.

8. The portable system of claim 7, wherein each of the first and second data transfer interfaces comprises a magnetic coupling.

9. The portable system of claim 7, wherein each smart card includes a keypad and display coupled to the control circuitry.

10. The portable system of claim 7, wherein the identification input system on at least one of the smart cards comprises a fingerprint sensor coupled to the control circuitry.

11. The portable system of claim 7, wherein the control circuitry includes a microprocessor.

12. The portable system of claim 7, wherein the secure data represents monetary values.

* * * * *